(12) United States Patent
Panduru

(10) Patent No.: US 11,956,166 B2
(45) Date of Patent: Apr. 9, 2024

(54) REFARMING TELECOMMUNICATIONS SPECTRUM BLOCKS IN A TELECOMMUNICATIONS NETWORK

(71) Applicant: T-Mobile USA, Inc., Bellevue, WA (US)

(72) Inventor: Flaviu Gabriel Panduru, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 183 days.

(21) Appl. No.: 17/560,087

(22) Filed: Dec. 22, 2021

(65) Prior Publication Data

US 2023/0198694 A1 Jun. 22, 2023

(51) Int. Cl.
| | |
|---|---|
| *H04L 5/00* | (2006.01) |
| *H04W 16/16* | (2009.01) |
| *H04W 72/0453* | (2023.01) |
| *H04W 72/27* | (2023.01) |

(52) U.S. Cl.
CPC .......... *H04L 5/0032* (2013.01); *H04L 5/0046* (2013.01); *H04W 16/16* (2013.01); *H04W 72/0453* (2013.01); *H04W 72/27* (2023.01)

(58) Field of Classification Search
CPC ... H04L 5/0032; H04L 5/0046; H04L 5/0069; H04W 16/16; H04W 72/0453; H04W 72/27; H04W 16/18; H04W 16/14; H04W 72/0486; H04W 72/52; H04W 16/02
See application file for complete search history.

(56) References Cited

U.S. PATENT DOCUMENTS

| | | |
|---|---|---|
| RE38,787 E | 8/2005 | Sainton et al. |
| 7,599,686 B2 | 10/2009 | Mehta |
| 7,876,786 B2 | 1/2011 | Bahl et al. |
| 7,894,821 B2 | 2/2011 | Bai et al. |
| 7,899,451 B2 | 3/2011 | Hu et al. |
| 8,073,458 B2 | 12/2011 | Chang |
| 8,175,612 B2 | 5/2012 | Palmer et al. |

(Continued)

FOREIGN PATENT DOCUMENTS

| | | |
|---|---|---|
| CN | 105813209 B | 10/2019 |
| CN | 109600190 B | 4/2020 |

(Continued)

*Primary Examiner* — Thai Nguyen
(74) *Attorney, Agent, or Firm* — Perkins Coie LLP

(57) ABSTRACT

A spectrum refarm system defines, for each of multiple geographic regions, a spectrum set that represents telecommunications spectrum blocks in use in a corresponding geographic region and a first distribution of technical allocations of each spectrum set. The first distribution of technical allocations for an identified spectrum set specifies telecommunications technologies that are deployed on the spectrum blocks in the identified spectrum set and a number of the spectrum blocks on which each technology is deployed. The spectrum refarm system can maintain the spectrum sets in a data store and modify information in the data store to cause a distribution of technical allocations for a first spectrum set to change from a respective first distribution to a second distribution. Information in the data store is also modified to cause a distribution of technical allocations for a second spectrum set to change from a respective first distribution to a third distribution.

20 Claims, 15 Drawing Sheets

(56) References Cited

U.S. PATENT DOCUMENTS

| | | |
|---|---|---|
| 8,422,469 B2 | 4/2013 | Guvenc |
| 8,483,120 B2 | 7/2013 | Seligsohn et al. |
| 8,824,436 B2 * | 9/2014 | Flore ................. H04L 5/001 455/432.1 |
| 9,094,899 B2 | 7/2015 | Smith et al. |
| 9,622,084 B2 | 4/2017 | Ren et al. |
| 9,629,020 B2 | 4/2017 | Smith et al. |
| 9,736,018 B2 | 8/2017 | Smith |
| 9,742,535 B2 | 8/2017 | Lorca Hernando |
| 9,801,115 B2 | 10/2017 | Sadek |
| 9,820,159 B2 | 11/2017 | Ghasemzadeh et al. |
| 9,832,653 B2 | 11/2017 | Smith et al. |
| 9,832,654 B2 | 11/2017 | Koskinen et al. |
| 9,867,058 B2 | 1/2018 | Tudose et al. |
| 9,883,405 B2 | 1/2018 | Soulie |
| 9,924,368 B2 | 3/2018 | Valliappan et al. |
| 9,930,536 B2 | 3/2018 | Smith et al. |
| 9,961,696 B2 | 5/2018 | Wang |
| 10,070,320 B2 | 9/2018 | Palamara et al. |
| 11,068,906 B2 | 7/2021 | Smith et al. |
| 2012/0120887 A1 | 5/2012 | Deaton et al. |
| 2016/0315792 A1 * | 10/2016 | Rahmati ............ H04B 7/0413 |
| 2016/0328120 A1 | 11/2016 | Smith |

FOREIGN PATENT DOCUMENTS

| | | |
|---|---|---|
| CN | 109982435 B | 12/2020 |
| DE | 10252489 A1 | 5/2004 |
| DE | 10154546 B4 | 6/2005 |
| DE | 102017125042 B4 | 10/2021 |
| EP | 1437667 A1 | 7/2004 |
| EP | 2974429 B1 | 11/2018 |
| WO | 2010065510 A1 | 6/2010 |
| WO | 2015090013 A1 | 6/2015 |
| WO | 2016011899 A1 | 1/2016 |
| WO | 2016149372 A1 | 9/2016 |
| WO | 2016153984 A1 | 9/2016 |
| WO | 2018022629 A1 | 2/2018 |
| WO | 2019125096 A1 | 6/2019 |

* cited by examiner

| | A3 | A4 | A5 | D | B3 | B4 | B5 | E |
|---|---|---|---|---|---|---|---|---|
| Area 1 | Operator A | Operator A | Operator A | Operator B | Operator D | Operator D | Operator D | Operator C |
| Area 2 | Operator B | Operator A | Operator A | Operator B | Operator C | Operator C | Operator D | Operator D |
| Area 3 | Operator C | Operator C | Operator A | Operator A | Operator D | Operator D | Operator D | Operator B |
| Area 4 | Operator A | Operator A | Operator A | Operator C | Operator D | Operator D | Operator D | Operator B |

*FIG. 4A*

| | Operator A | | | | | | Operator B | | | |
|---|---|---|---|---|---|---|---|---|---|---|
| | Spectrum | current customers | U/S Block | U/S Block | U/S Block | primary CDMA block | capacity CDMA blocks | | | |
| Area 1 | C3:C4 | 35 | 5 C3 | 10 C4_C5 | 36 | 32 D | A5 | | | 5.5 |
| Area 2 | C3:C4 | 24 | 5 C3 | 10 C4_C5 | 16 | 22 D | E,F | B3_B4,G | 10.5 | |
| Area 3 | C4:F | 29 | 5 F | 5 C4_shift | 24 | 20 D | 0 C5_G | E,G | | 10 |

TMUS HW review

| Vendor | T-Mobile Sites | | LTE PCS Absorption in MHz with existing radios | | | | |
|---|---|---|---|---|---|---|---|
| | T-Mobile vendor | Sites with L19 | Sites L19 Reach | 0 | 5 | 10 | 15 | 20+ |
| Area 1 | Nokia | 146 | 0 | 112 | 0 | 33 | 1 | 0 |
| Area 2 | Nokia | 37 | 0 | 15 | 0 | 26 | 0 | 0 |
| Area 3 | Nokia | 30 | 0 | 29 | 1 | 0 | 0 | 0 |
| Area 4 | Nokia | 36 | 0 | 31 | 2 | 3 | 0 | 0 |

FIG. 4D

| County name | FIPS | State | Region | T Mobile Market | Bucket | sub-area nickname | BTA | BTA name | Total Pops |
|---|---|---|---|---|---|---|---|---|---|
| Holmes | 39075 | Ohio | CENTRAL | Cleveland, OH | A | Cleveland core | 84 | Cleveland-Akron, OH | 43,896 |
| Erie | 42049 | Pennsylvania | CENTRAL | Cleveland, OH | A | Erie | 131 | Erie, PA | 274,234 |
| Columbiana | 39029 | Ohio | CENTRAL | Cleveland, OH | A | Erie | 122 | East Liverpool-Salem, OH | 102,730 |
| Stark | 39151 | Ohio | CENTRAL | Cleveland, OH | A | Stark | 65 | Canton-New Philadelphia, ( | 372,948 |

REFARMING TELECOMMUNICATIONS SPECTRUM BLOCKS IN A TELECOMMUNICATIONS NETWORK

BACKGROUND

Modern telecommunications networks support many different wireless communication technologies in order to enable a wide variety of user devices to operate on the network. Telecom operators may operate in multiple frequency bands. Within each band, spectrum is typically licensed per group or range of frequencies, defined as a "spectrum block." A telecom network is typically licensed specific spectrum blocks in any given area. Different user devices are allocated to operate within different spectrum blocks, such that devices are distributed across the available blocks according to technical requirements of the devices, expected bandwidth in each band, or other criteria. Since the throughput of the communications network is affected, in part, by the number of devices utilizing a frequency band at one time, a telecommunications network can improve its performance by ensuring that the user devices operating in the same geographic area are allocated to spectrum blocks such that the communications in the area are distributed across the available blocks.

However, it can be difficult for a telecom network to know which technologies are actually using which specific blocks in a given area in relation to the overall spectrum that is available in the area, as well as to efficiently manage the optimum allocation of spectrum blocks to various technologies. As new telecommunications technologies become available and older technologies are phased out, the telecommunications network needs to respond to shifts in the utilization of various technologies to avoid network performance issues, without impacting the ability of older devices to continue to use the network. The shift of blocks from one technology to another is one way in which spectrum refarming takes place. Furthermore, a network may benefit from new spectrum blocks, which could be the result of a spectrum purchase, a trade with another operator, a merger, or an acquisition. The spectrum refarming in these cases takes place when the new blocks are being repurposed from whatever usage they had, including no usage, to another technology.

BRIEF DESCRIPTION OF THE DRAWINGS

Detailed descriptions of implementations of the present invention will be described and explained through the use of the accompanying drawings.

FIG. 4A illustrates an example mapping between spectrum blocks in a geographic area and ownership of each block in some implementations.

FIG. 4B illustrates an example mapping between telecommunications technologies and spectrum blocks employed by each technology in some implementations.

FIG. 4C illustrates an example mapping between hardware capabilities in some implementations.

FIG. 4D illustrates an example mapping between geographic identifiers in some implementations.

Figure 1:
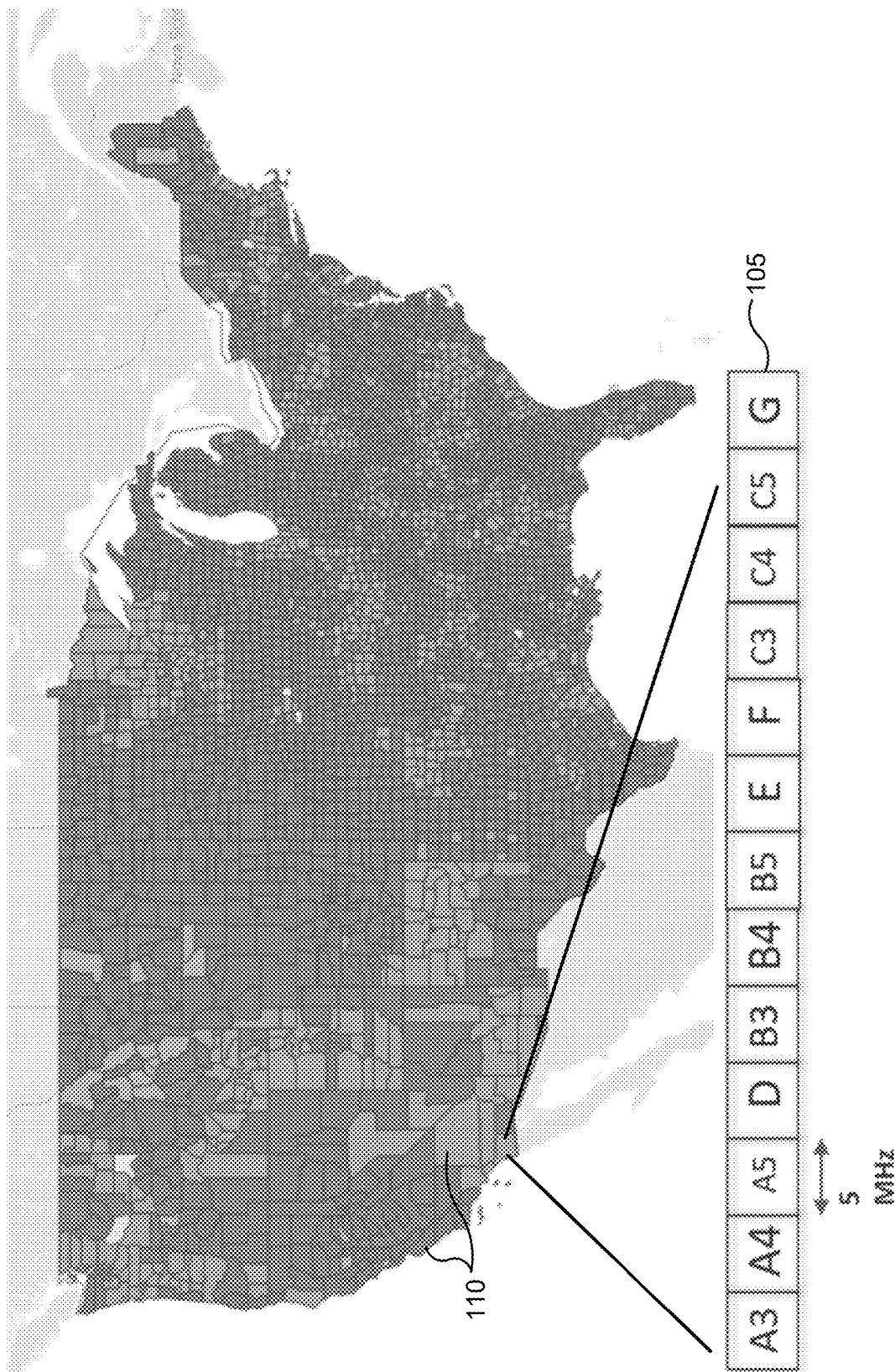
FIG. 1 is a map illustrating example geographic regions in which a telecommunications network operates and example licensed spectrum blocks in a geographic region.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A telecommunications network usually supports multiple telecom technologies across multiple spectrum blocks in most or all geographic areas in which the telecommunications network operates. As discussed above, existing systems are unable to efficiently manage the allocation of spectrum blocks to the available technologies as demand for each technology evolves over time. To solve these and other problems with existing systems, the inventors have conceived of and reduced to practice a spectrum refarm system enabling reallocation of the spectrum blocks to new technologies in order to phase out old technologies, phase in new technologies, and increase bandwidth for customers of the network. The spectrum refarm system defines, for each of multiple geographic regions, a spectrum set that represents telecommunications spectrum blocks in use in a corresponding geographic region and a first distribution of technical allocations of each spectrum set. The first distribution of technical allocations for an identified spectrum set specifies telecommunications technologies that are deployed on the multiple telecommunications spectrum blocks in the identified spectrum set and a number of the telecommunications spectrum blocks on which each telecommunication technology is deployed. The spectrum refarm system can maintain the spectrum sets in a data store that is modified to change the first distribution of technical allocations. For example, information in the data store is modified to cause a distribution of technical allocations for a first spectrum set to change from a respective first distribution to a second distribution, and modified to cause a distribution of technical allocations for a second spectrum set to change from a respective first distribution to a third distribution that is different from the second distribution. In some implementations, the spectrum refarm system generates an interactive diagram that represents the spectrum set and modifies information in the data store in response to user inputs received at the interactive diagram. Managing spectrum usage for an entire network in an organized and strategic way helps optimize operational costs and resources, improve customer experience, reduce unused spectrum, reduce interference, decrease deployment delays, and efficiently integrate new technologies into the network The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 is a map illustrating example geographic regions in which a telecommunications network operates. The telecom network facilitates wireless telecommunication between user equipment (also referred to herein as "user devices"), which include, for example, a mobile phone, a personal digital assistant (PDA), a wireless modem, a handheld mobile device, a tablet computer, a laptop computer, or a wearable. A wireless device can be included in another device such as, for example, a drone, a vehicle, an augmented reality/virtual reality (AR/VR) device such as a head-mounted display device, an IoT device such as an appliance in a home, a portable gaming console, or a wirelessly connected sensor that provides data to a remote server over a network. User equipment licensed to operate on the telecommunications network communicate with other devices by sending and receiving wireless carrier signals modulated with a data signal. The telecom network can include network infrastructure that is capable of supporting communications according to multiple wireless communication technologies. For example, a telecom network may support a combination of technologies such as code division multiple access (CDMA), global system for mobiles (GSM), evolution-data optimized (EVDO), universal mobile telecommunications service (UMTS), long term evolution (LTE), or 5G.

The telecommunications network licenses various spectrum blocks for use by the devices that communicate over the network. An example set 105 of spectrum blocks that can be licensed by the telecom network is illustrated in FIG. 1. Each spectrum block represents a specified range of frequencies that is typically defined by a regulatory agency such as the Federal Communications Commission (FCC) in the United States. For example, within the frequency band allocated for personal communications services (PCS) by the FCC, each spectrum block spans a range of 5 MHz. The telecom network distributes communications across the licensed spectrum blocks, in part to reduce interference between user equipment. For example, the telecom network configures its network infrastructure such that certain telecom technologies use certain spectrum blocks, such that the carrier signal sent or received by a device utilizing a certain technology is a signal with a frequency that falls within the frequency range corresponding to the spectrum block configured for use by that technology.

The map in FIG. 1 further shows that the operational area of the telecommunications network is divided into smaller geographic areas 110, which for example follow county lines or represent groups of counties. Within each geographic area, the telecom network may license different sets of the PCS spectrum blocks. The technologies supported by the telecom network can also be allocated differently among the PCS spectrum blocks in each geographic area. For example, a first geographic area can include blocks B3, B4, and G allocated for LTE communications and block E allocated for CDMA communications. In a second geographic area, the telecom network licenses only block B4 for LTE communications and blocks D and E for CDMA communications. The allocations of technologies to the set of spectrum blocks in a given geographic area can be based on a variety of factors, such as the identity of the spectrum blocks that are licensed within the geographic area, the number of user devices that use each technology in the geographic area, the number of sites or base stations that the network operator has already deployed in that geographic area, the hardware capabilities or limitations of the sites deployed in the area, the population count in the area, the presence of spectrum swap deals in progress with other network operators, current allocation of technologies in neighboring areas, or the presence of external factors that may affect bandwidth (such as other equipment that communicates at or near the frequencies in each block, or geographic or zoning limitations that affect the placement of basestations or other network equipment).

Figure 2:
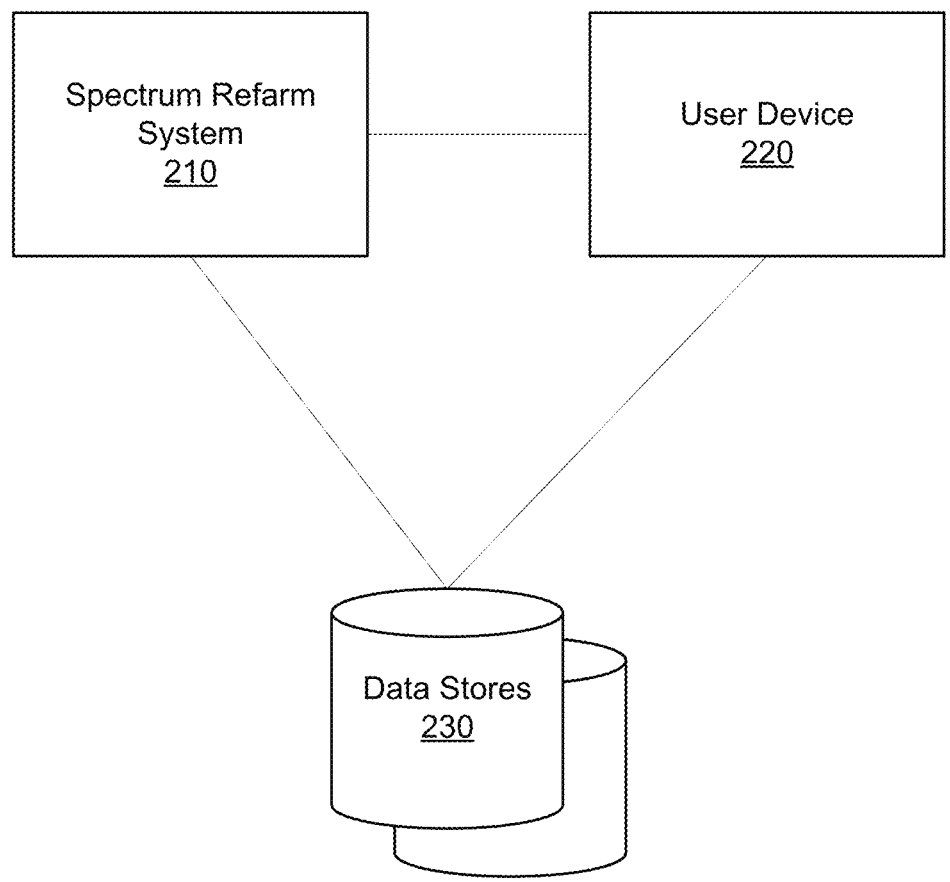
FIG. 2 is a block diagram illustrating a high-level computing environment in which a spectrum refarm system operates in some implementations.

A spectrum refarm system in a telecommunications network enables reallocation or integration of spectrum blocks, for example to deploy new technologies within the network, transition from the technical allocation used by a previous owner of the block to the technical allocation desired by a new owner, or to increase bandwidth available for certain technologies. FIG. 2 is a block diagram illustrating a high-level computing environment in which a spectrum refarm system operates, according to some implementations. As shown in FIG. 2, the environment includes the spectrum refarm system 210, one or more user devices 220, and one or more data stores 230.

The spectrum refarm system 210 defines current spectrum block allocation data in the telecommunications network and facilitates refarming of spectrum blocks. The spectrum refarm system 210 is described further with respect to FIG. 3.

The user device 220 includes one or more computing devices used by a user to interact with the spectrum refarm system 210. For example, user interfaces generated by the spectrum refarm system 210 can be output to a user via the user device 220. The user devices 220 can furthermore receive inputs from the user (e.g., via one or more user interfaces) and transmit the received inputs to the spectrum refarm system 210. The user device 220 can include any of a variety of types of computing devices that are capable of communicating directly or indirectly with the spectrum refarm system 210, displaying information to a user of the device, and receiving inputs from the user. Example devices usable as the user device 220 include a desktop or laptop computer, a mobile phone, a tablet, or a smart television.

The one or more data stores 230 store data that can be accessed by the spectrum refarm system 210. The data stores 230 can include data originating from any of a variety of data sources, including sources internal to the telecommunications network with which the spectrum refarm system 210 is associated, as well as sources external to the telecommunications network. For example, data stores 230 associated with internal data sources can store data including data identifying geographic areas in which the telecommunications system operates (e.g., the physical locations of its base stations and other networking equipment), data identifying the spectrum blocks owned by the telecommunications network, data identifying the current technology that uses each spectrum block, data identifying types of devices (e.g., make and model) that are authorized for use on the network, and data identifying customers subscribed to the network and the type of device(s) used by each subscriber. Data stores 230 associated with external data sources can store data such as the technical specifications of various types of devices, as well as data identifying spectrum blocks operated by other telecommunications networks and the technologies deployed on each block. Furthermore, the data stores 230 can store information regarding the spectrum sets in the network; current, past, and future distributions planned for each geographic area; progress of the planned refarming in each area; a count of blocks that have already been refarmed in each area; a number of sites or base stations that the network operator has deployed in each geographic area; hardware capabilities or limitations of each deployed site; and/or total population count in each geographic area.

Figure 3:
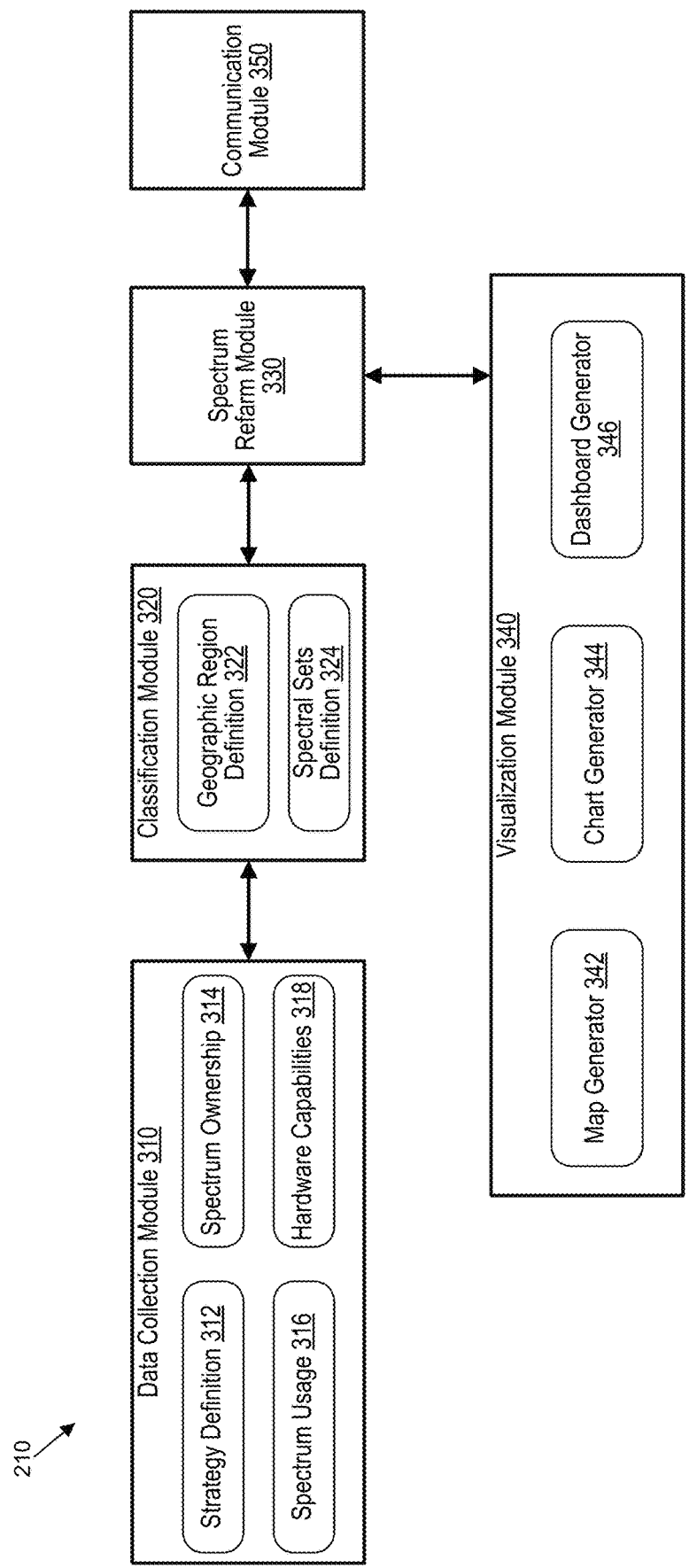
FIG. 3 is a block diagram illustrating logical modules executed by a spectrum refarm system in some implementations.

FIG. 3 is a block diagram illustrating logical modules executed by the spectrum refarm system 210, according to some implementations. As shown in FIG. 3, the modules can include a data collection module 310, a classification module 320, a spectrum refarm module 330, a visualization module 340, and a communication module 350. The logical modules shown in FIG. 3 can be implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein.

The data collection module 310 collects various types of data to define current technical allocations for telecommunications spectrum blocks and to enable spectrum refarm of the blocks. The data collection module 310 can retrieve data from any of a variety of data sources internal or external to the telecom network, for example via one or more application programming interfaces (APIs). Some of the data retrieved by the data collection module 310 can be input by a user, such as an administrator of the telecom network. The data collection module 310 can include one or more submodules for collecting and processing various types of data. For example, as shown in FIG. 3, the data collection module 310 includes a strategy definition submodule 312, a spectrum ownership submodule 314, a spectrum usage submodule 316, and a hardware capabilities submodule 318. Collectively, the submodules within the data collection module 310 generate or modify information in one or more databases, electronic files, or other computer-readable data stores that maintain the collected data and mappings between data items generated by the submodules.

The strategy definition submodule 312 retrieves and processes data usable to define spectrum refarm strategies in the telecommunications network. Strategies of the telecommunications network can include, for example, expanding bandwidth for growing technologies, reducing bandwidth for shrinking technologies, shutting down legacy technologies, launching new technologies, or modifying technical allocations in response to deals with other telecom network operators (such as purchase or sale of spectrum blocks) or mergers, acquisitions, or spectrum auctions. In some cases, the strategy definition submodule 312 receives explicit user input to define a strategy for a specified subset of the spectrum blocks. For example, user input is received that defines a strategy to transition a set of blocks in Region A from supporting Technology A to supporting Technology B. In other cases, the strategy definition submodule 312 applies one or more rules to a broader strategic goal to define a strategy for a set of spectrum blocks. For example, given the strategic goal to transition 10% of blocks from an older Technology A to a newer Technology B, the strategy definition submodule 312 selects spectrum blocks that currently support Technology A and can be transitioned to Technology B. Such blocks can be selected based on rules that account for amount of bandwidth for Technology A that is supported within the region, the current number of customers who use Technology A in the region, predictions for future utilization or bandwidth availability, or other similar factors. Once the blocks are selected, the strategy definition submodule 312 can associate the selected blocks with the strategy of transitioning from Technology A to Technology B.

The spectrum ownership submodule 314 retrieves and processes data indicative of the ownership of each spectrum block in the geographic area covered by the telecommunications network. The output of the spectrum ownership submodule 314 is a mapping between spectrum blocks in a given geographic area and the owner of the block. An example of such a mapping is illustrated in FIG. 4A. In FIG. 4A, each row of the table corresponds to a different geographic area, such that four example geographic areas ("Area 1," "Area 2," "Area 3," and "Area 4") are represented. The spectrum blocks in each of the areas is mapped one of four different telecommunications operators that owns the block in the corresponding geographic area.

The spectrum usage submodule 316 retrieves and processes data indicative of the technologies deployed on each spectrum block in the geographic area covered by the telecommunications network. The output of the spectrum usage submodule 316 is a mapping between types of telecommunications technologies and the spectrum blocks employed by those technologies, for each of multiple geographic areas. An example of such a mapping is illustrated in FIG. 4B. In FIG. 4B, each row of the table corresponds to a different geographic area, such that three example geographic areas ("Area 1," "Area 2," and "Area 3") are represented.

The hardware capabilities submodule 318 retrieves and processes data indicative of the network equipment used by the telecommunications network, as well as types of technologies supported by each of the devices. The devices analyzed by the hardware capabilities submodule can include any devices that may affect the ability of the telecom network to transition from one technology to another or to increase the bandwidth of a certain technology. The devices analyzed by the hardware capabilities submodule can include core network equipment, radio access network equipment, or air interface equipment. The number of sites that the network operator already has deployed on each technology in a given area can also be taken into consideration. The output of the hardware capabilities submodule 318 is a mapping between the equipment currently in use by the telecom network, the number of sites where the equipment is deployed, and the ability of the equipment to support a desired expansion of bandwidth for each technology in a given geographic area. An example of such a mapping is illustrated in FIG. 4C, where each row of the table corresponds to a different geographic area, such that four geographic areas ("Area 1," "Area 2," "Area 3," and "Area 4") are represented.

The classification module 320 processes the data collected by the data collection module 310 to create spectrum datasets that are usable in a refarm process. As shown in FIG. 3, the classification module 320 includes a geographic region definition submodule 322 and a spectral sets definition submodule 324. The submodules associated with the classification module 320 retrieve data from the databases, electronic files, or other computer-readable data stores in which the data collection module 310 stored its collected data and generated mappings. As the classification module 320 processes the data, the classification module 320 can generate new computer-readable data stores or can modify information in the data stores maintained by the data collection module 310.

The geographic region definition submodule 322 defines geographic regions within the area covered by the telecommunications network. The geographic region definition submodule 322 retrieves data to create mappings between various geographic identifiers. An example mapping is shown in FIG. 4D, which illustrates, for example, that the geographic region definitions submodule 322 collects a county name, Federal Information Processing Standard (FIPS) code, an identifier of the region within the telecom network, an identifier of the market within the telecom network, a basic trading area (BTA) identifier and BTA name, and the total population of the county. The mapping shown in FIG. 4D further maps the geographic regions to classifications such as a nickname applied to the region and a bucket indicating a relative priority of the region for refarming. Once the geographic identifier mapping is complete, the geographic region definition submodule 322 defines areas (referred to herein as "geographic regions") that correspond to subdivisions in the overall area serviced by the telecom network and that are meaningful for refarming the spectrum blocks utilized by the network. The boundaries of the geographic regions may or may not align with boundaries of standard geographic regions, such as city or county limits. For example, a geographic region defined by the geographic region definition submodule 322 can include multiple cities. Another geographic region can include a first portion of a county in which the telecom network operates, but not include a second portion of a county in which the telecom network does not operate.

The spectral sets definition submodule 324 generates spectral sets that each represent similar spectrum blocks. Similarity of a set of spectrum blocks can include similarity of ownership and similarity of usage of the blocks, for any parties associated with the blocks and any technologies deployed on the blocks. Two sets can be determined to be similar if the sets have fewer than a threshold number of differences For example, the following two sets X and Y can be determined to be similar:

| Set | Usage of Blocks in Set |
|---|---|
| X | Owner A LTE (B3, B4, B5) |
|   | Owner B LTE (F) |
|   | Owner B CDMA (C3) |
| Y | Owner A LTE (B3, B4) |
|   | Owner B LTE (F) |
|   | Owner B CDMA (C3) |

Sets X and Y in the above example are similar because Owner A's LTE usage can be expanded to block B5 to match the usage in Set X (e.g., representing one difference between Sets X and Y). In another example, sets W and Z are similar because swapping usage of blocks F and C3 in Set Z causes the usage in Set Z to match that of Set W (e.g., representing two differences between Sets W and Z):

| Set | Usage of Blocks in Set |
|---|---|
| W | Owner A LTE (B3, B4, B5) |
|   | Owner B LTE (F) |
|   | Owner B CDMA (C3) |
| Z | Owner A LTE (B3, B4, B5) |
|   | Owner B LTE (C3) |
|   | Owner B CDMA (F) |

In contrast, the following sets U and V may be determined to not be similar because the number of differences between the sets is too large:

| Set | Usage of Blocks in Set |
|---|---|
| U | Owner A LTE (B3, B4, B5) |
|   | Owner B LTE (F) |
|   | Owner B CDMA (C3) |
| V | Owner A LTE (F, C3) |
|   | Owner B LTE (B3, B4) |
|   | Owner B CDMA (B5) |

After defining the spectral sets, the spectral sets definition module 324 can map each set to one of the geographic regions defined by the geographic region definitions submodule 322.

The spectrum refarm module 330 defines procedures for changing a distribution of technical allocations within individual spectrum sets. As described above, each spectrum block in a given geographic region can be allocated for communications employing one or more specified telecom technologies. As a result, each spectrum set has a distribution of technical allocations that is defined by the technologies deployed within the spectrum set and the number of blocks in the spectrum set on which each technology is deployed. In general, the spectrum refarm module 330 defines a multi-step process for altering the distribution of technical allocations for a specified spectrum set. A distribution can be changed, for example, by reallocating a spectrum block from one technology to another technology, adding a new spectrum block to the spectrum set (e.g., by licensing a new block) and allocating the new block to a specified technology, or removing a spectrum block from the spectrum set. The spectrum refarm module 330 also records into the data stores 230 the progress of changing distributions in each area (the current refarm step), as well as the current distribution in each area that has completed any refarm step. The multi-step process enables the telecom network to strategically increase the amount of bandwidth that is available for newer technologies as the newer technologies are adopted by increasingly larger sets of customers, while continuing to serve customers that still have user equipment relying on older technologies.

User inputs can specify both a spectrum set that is to be refarmed as well as the changes that will be made in the multi-step process to modify the distribution of technical allocations for the selected spectrum set, in some implementations. Alternatively, the spectrum refarm module 330 can select a spectrum set or recommend a process to achieve one of the strategies, based on application of one or more rules or models. For example, if a strategy defined for the telecom network is to transition blocks from an older technology to a newer technology, the spectrum refarm module 330 identifies any spectrum sets within which the older technology is deployed and filters the identified spectrum sets to identify, for example, any spectrum set with multiple blocks allocated to the older technology, any spectrum set for which less than a threshold number of customers still use the older technology, or any spectrum set that meets another criterion specified by a rule. In another example, if a strategy is to improve bandwidth for customers of the telecommunications network, the spectrum refarm module 330 identifies a spectrum set for which a little-used technology is deployed on a significant portion of the blocks in the set and a more popular technology is deployed on relatively fewer blocks. By transitioning the blocks from supporting the little-used technology to supporting the popular technology, the spectrum refarm module 330 increases the bandwidth available to the user equipment utilizing the popular technology without significantly interrupting service available to the little-used technology. In still another example, the spectrum refarm module 330 recommends technologies to be deployed on newly acquired spectrum blocks, such as by identifying a technology that is most popular in a given geographic region or the technology that suffers the greatest bandwidth limitations in the geographic region.

The visualization module 340 generates a variety of user interfaces to represent data generated by other submodules of the spectrum refarm system 210. The user interfaces generated by the visualization module 340 can include both interfaces that receive user inputs to define spectrum refarm processes, as well as interfaces that display expected or actual results after spectrum blocks have been refarmed according to a defined refarm process. For example, the visualization module 340 includes a map generator 342 to generate maps, a chart generator 344 to generate graphs or charts, and a dashboard generator 346 to generate dashboards. The visualization module 340 can create customer user interfaces and/or interact with commercial tools such as spreadsheet tools, mapping tools, or data visualization tools. Any of the maps, graphs/charts, or dashboard can be used to illustrate a refarm process for a given area, newly deployed or harvested spectrum blocks, expansion or contraction of technologies, expansion or contraction of bandwidth, or other types of data. Example user interfaces generated by the visualization module 340 are described further with respect to FIGS. 6A-6C and FIGS. 8-9.

The communication module 350 enables communication between components of the spectrum refarm system 210 and external systems, such as the user device 220. The communication module 350 can facilitate retrieval of any of the types of data described herein, and can enable reports or status updates to be output to relevant stakeholders.

Visual Refarming of Spectrum Blocks

Figure 5:
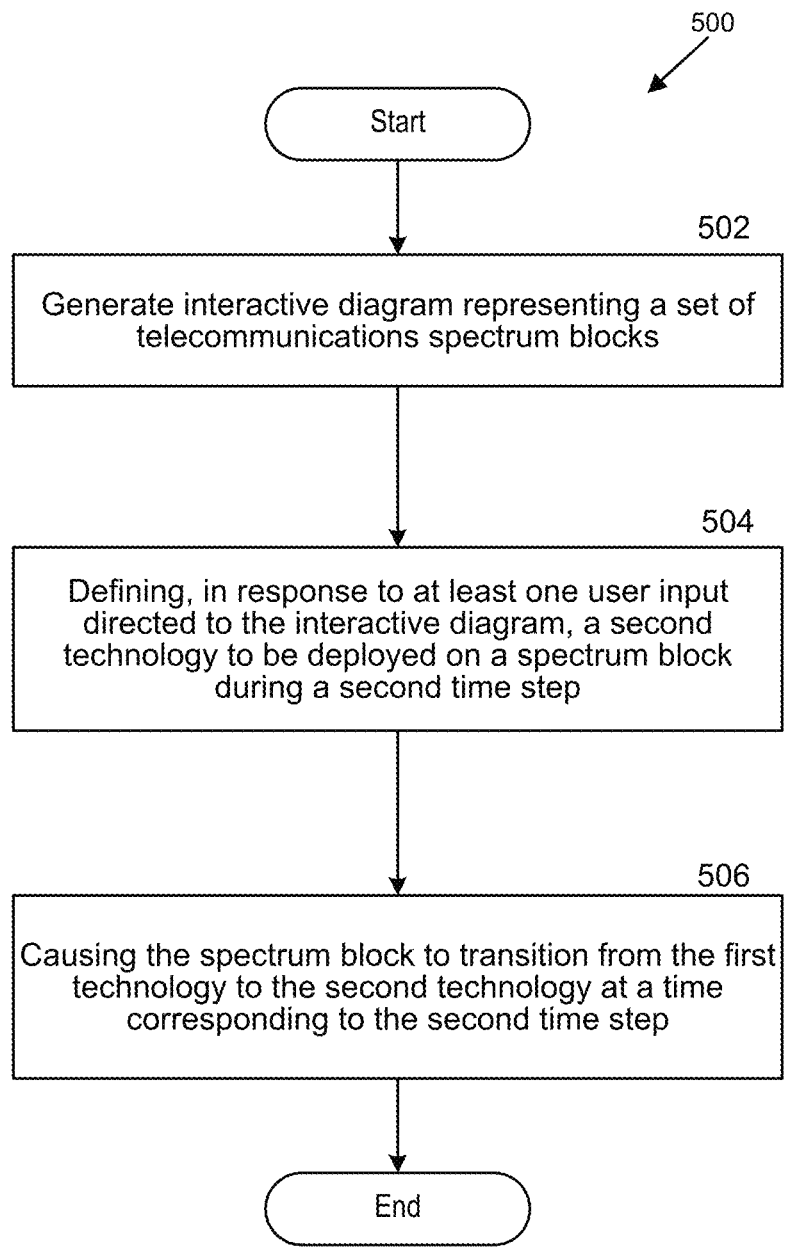
FIG. 5 is a flowchart that illustrates a process for visually creating a multi-step procedure to refarm spectrum blocks in some implementations.

FIG. 5 is a flowchart that illustrates a process 500 for visually creating a multi-step procedure to refarm spectrum blocks. The process 500 can be performed by the spectrum refarm system 210. Other implementations of the process 500 can include additional, fewer, or different steps, or can perform the steps in different orders.

At block 502, the spectrum refarm system 210 generates an interactive diagram representing multiple telecommunications spectrum blocks and identifying a technology deployed on each of the blocks. For example, the interactive diagram visually represents the technologies deployed within a given spectrum set. The interactive diagram can be accessed and displayed by a user device, such as the user device 220. A user can use the device 220 to view the interactive diagram corresponding to a spectrum set of interest.

Figure 6A:
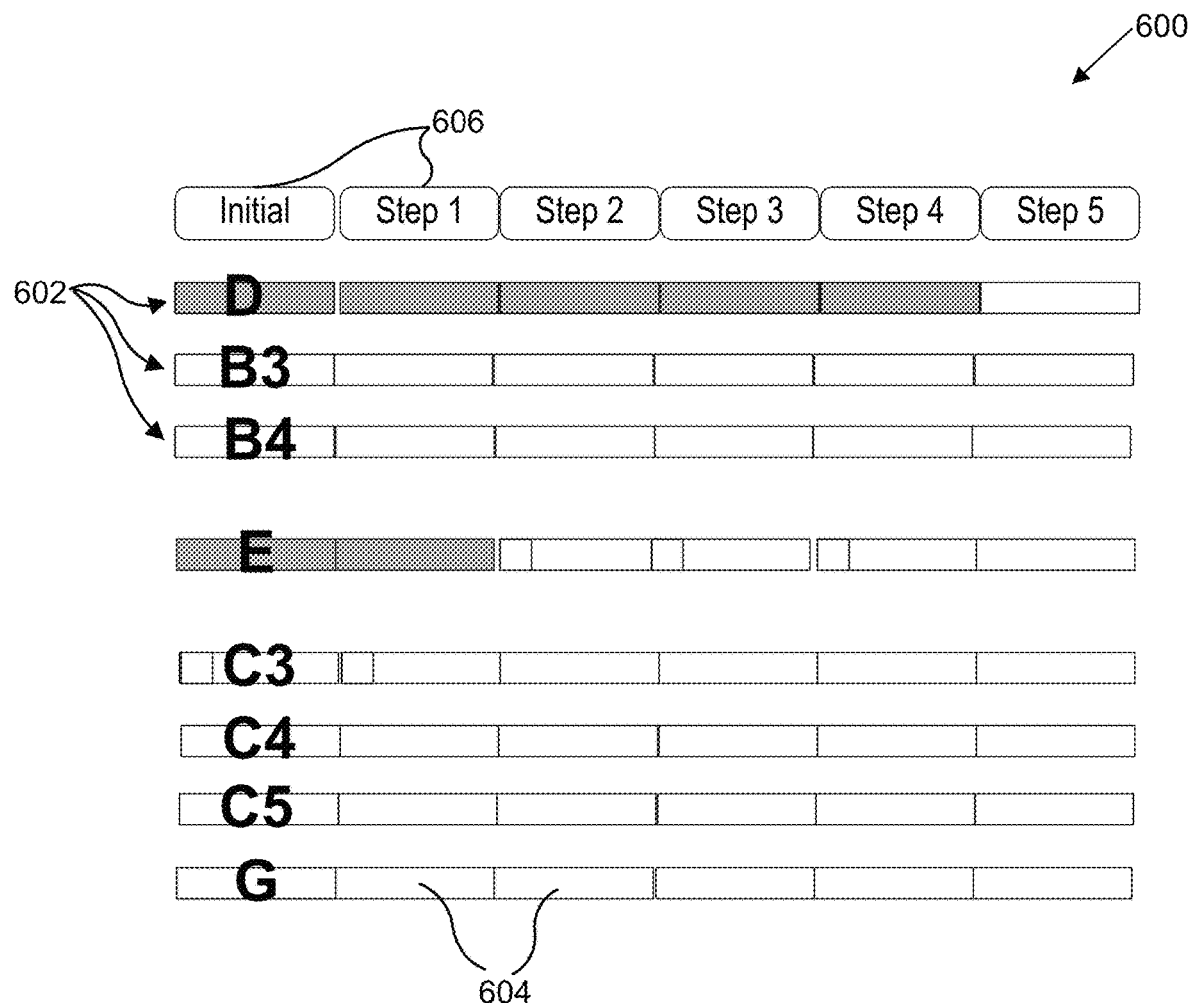
FIGS. 6A-6C illustrate an example interactive diagram in some implementations.

An example interactive diagram 600 is shown in FIG. 6A. As illustrated, the diagram 600 includes rows 602 that each correspond to a spectrum block in use in the geographic area for which the interactive diagram is generated. For each block, an indicator 604 identifies the technology that is currently deployed on the block, as well as the technologies that are planned to be deployed on the block for future time steps 606. The time steps 606 represent sequential targets for transitioning the technical allocations of the spectrum blocks represented in the diagram. Each time step 606 can therefore represent a specified period of time (such as a certain number of months) or an unspecified period of time that elapses when the target technical allocation is achieved, depending on the objectives of the telecommunications network. The technology indicators 604 used to represent the various technologies deployed on the spectrum blocks can have different colors, patterns, shapes, text labels, or other unique identifiers to visually distinguish the different technology types.

Figure 6B:
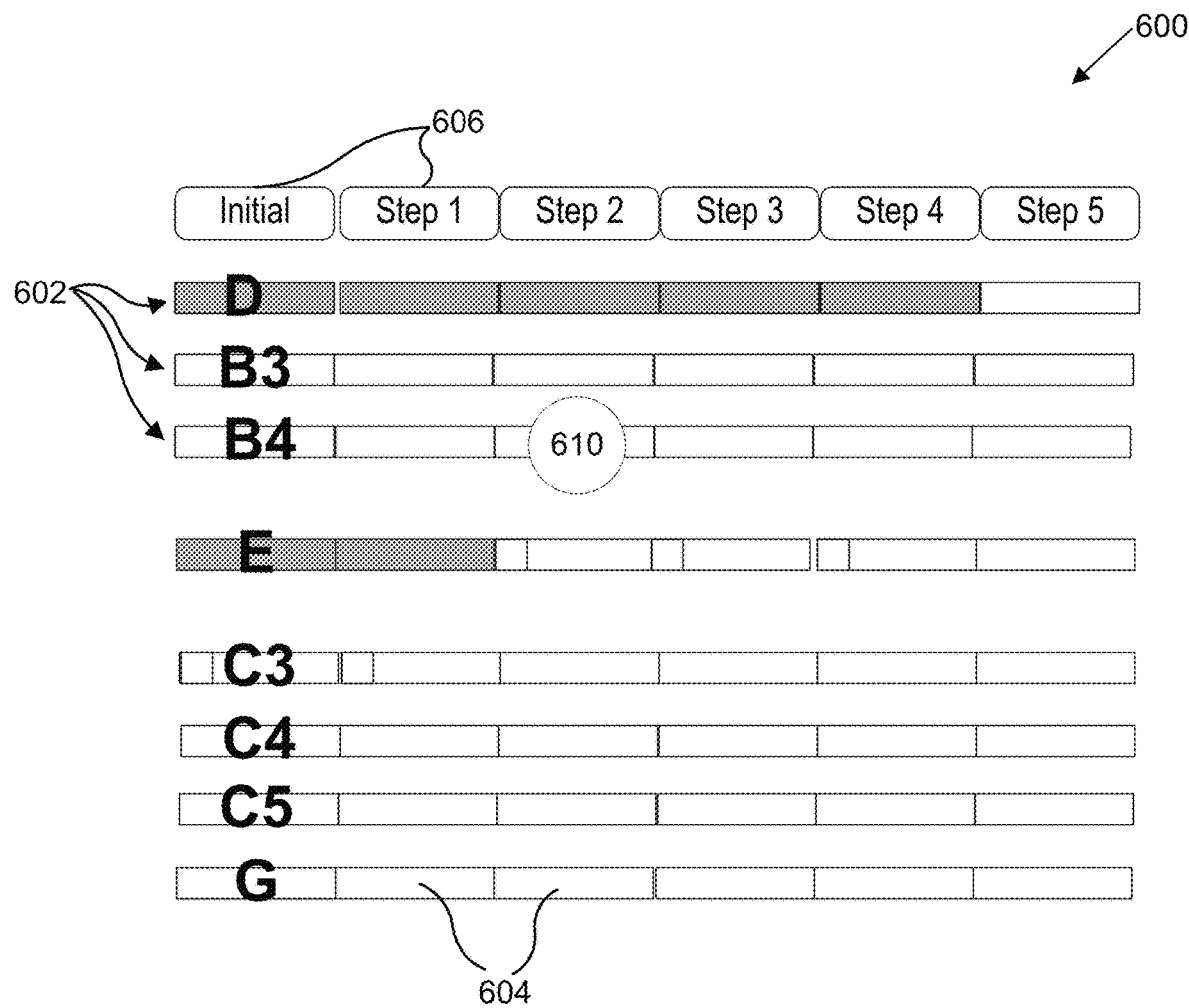

Returning to FIG. 5, at block 504 the spectrum refarm system 210 defines a second technology to be deployed on a selected spectrum block during a second time period, in response to at least one user input directed to the interactive diagram. For example, FIG. 6B illustrates that a user input 610 has been received to transition spectrum block B4 from Technology B to Technology E at Step 2.

Figure 6C:
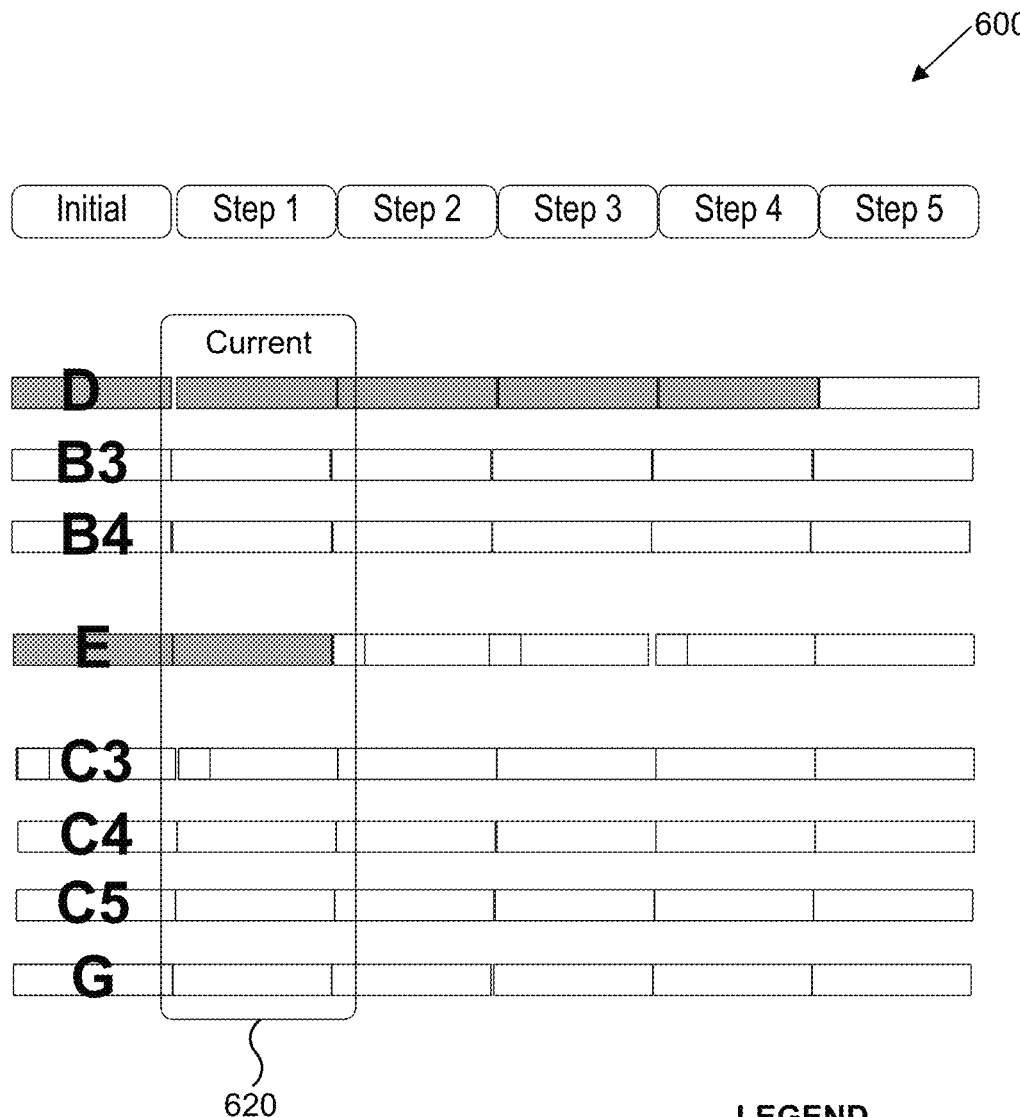

At block 506, the spectrum refarm system 210 causes the selected spectrum block to transition from the first technology to the second technology at a time corresponding to the second time step. To cause the spectrum block to transition, the spectrum refarm system 210 can modify information in a data store, such as the data store generated and maintained by the data collection module 310 and the classification module 320. Once the information in the data store has been modified, the spectrum refarm system 210 can automatically cause the selected spectrum block to transition to the second technology at a specified time. Alternatively, the spectrum refarm system 210 can alert an operator to transition the selected spectrum block to the second technology. As spectrum blocks are transitioned, the spectrum refarm system 210 can update the data store 230. While the spectrum refarm process is underway, the interface diagram 600 can be updated based on the data store 230 to display an indicator identifying the step that represents the current refarm step. For example, FIG. 6C illustrates a window 620 that slides to identify that the distribution implemented in the corresponding geographic region has changed from the distribution corresponding to an "Initial" step to one corresponding to "Step 1" as defined in the data store.

Figure 7:
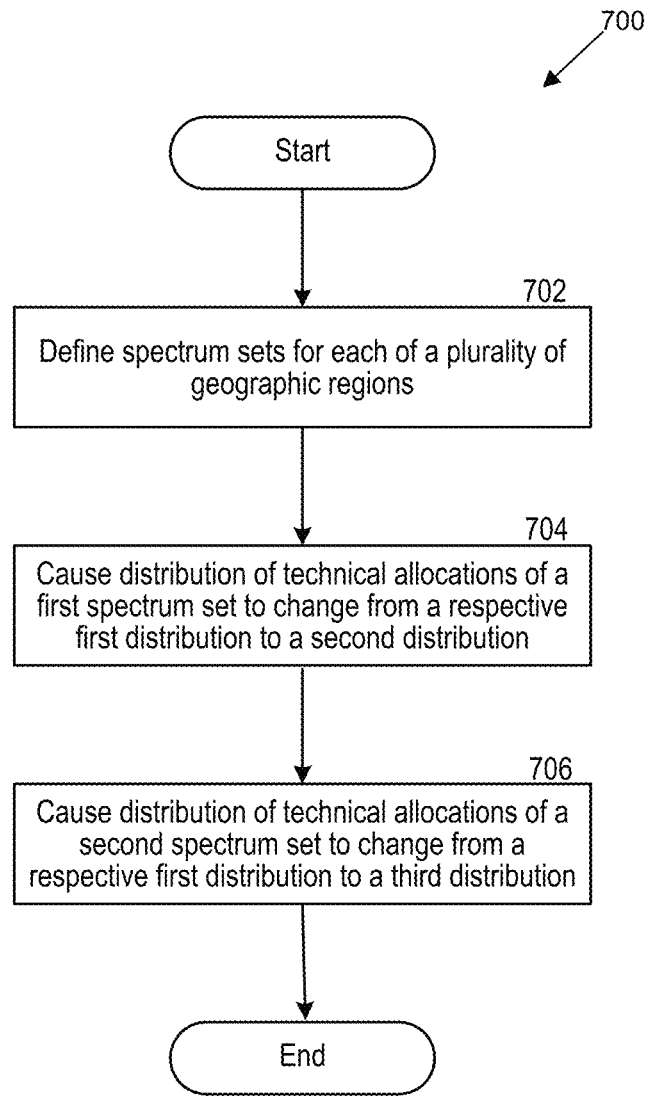
FIG. 7 is a flowchart that illustrates a process for refarming spectrum blocks in a telecommunications network in some implementations.

FIG. 7 is a flowchart that illustrates a process 700 for refarming spectrum blocks in a telecommunications network, according to some implementations. The process 700 can be performed by the spectrum refarm system 210. Other implementations of the process 700 can include additional, fewer, or different steps, or can perform the steps in different orders.

At block 702, the spectrum refarm system 210 defines spectrum sets for each of a plurality of geographic regions. The spectrum set represents telecommunications spectrum blocks that are in use in a corresponding geographic region, either by the telecommunications network associated with the spectrum refarm system 210 or by any telecom network that operates in the geographic region. For each of the defined spectrum sets, the spectrum refarm system 210 can identify the telecom technologies that are currently deployed on each of the spectrum blocks, and thereby determine a first distribution of technical allocations for each spectrum set.

The spectrum sets and associated data can be maintained in a data store, such as one or more databases or electronic documents such as spreadsheets.

At block 704, the spectrum refarm system 210 causes a distribution of technical allocations for a first spectrum set to change from a respective first distribution to a second distribution. In order to cause the distribution of technical allocations to change, the spectrum refarm system 210 can modify information in the data store to indicate that at least one of the blocks in the first spectrum set is to be changed from a first technology to a second technology, to indicate that a new block is to be added to the spectrum set, or to indicate that a block is to be removed from the spectrum set. For example, the spectrum refarm system 210 can modify information in the data store by creating a new database entry or new spreadsheet column to identify the technologies that will be deployed on the blocks in the spectrum set at a future time step. Alternatively, the spectrum refarm system 210 can modify information in the data store by changing the technologies specified for deployment at a future time step. Information in the data store can be modified in response to a user input, such as a user input directed to an interactive diagram as described with respect to FIGS. 5 and 6A-6B.

At block 706, the spectrum refarm system 210 causes a distribution of technical allocations for a second spectrum set to change from a respective first distribution to a third distribution. Like the first spectrum set, the distribution of technical allocations for the second spectrum set can be changed in response to a user input, and the spectrum refarm system 210 can modify information in the data store to indicate the change.

Visualizing Spectrum Refarming in a Communications Network

Figure 8:
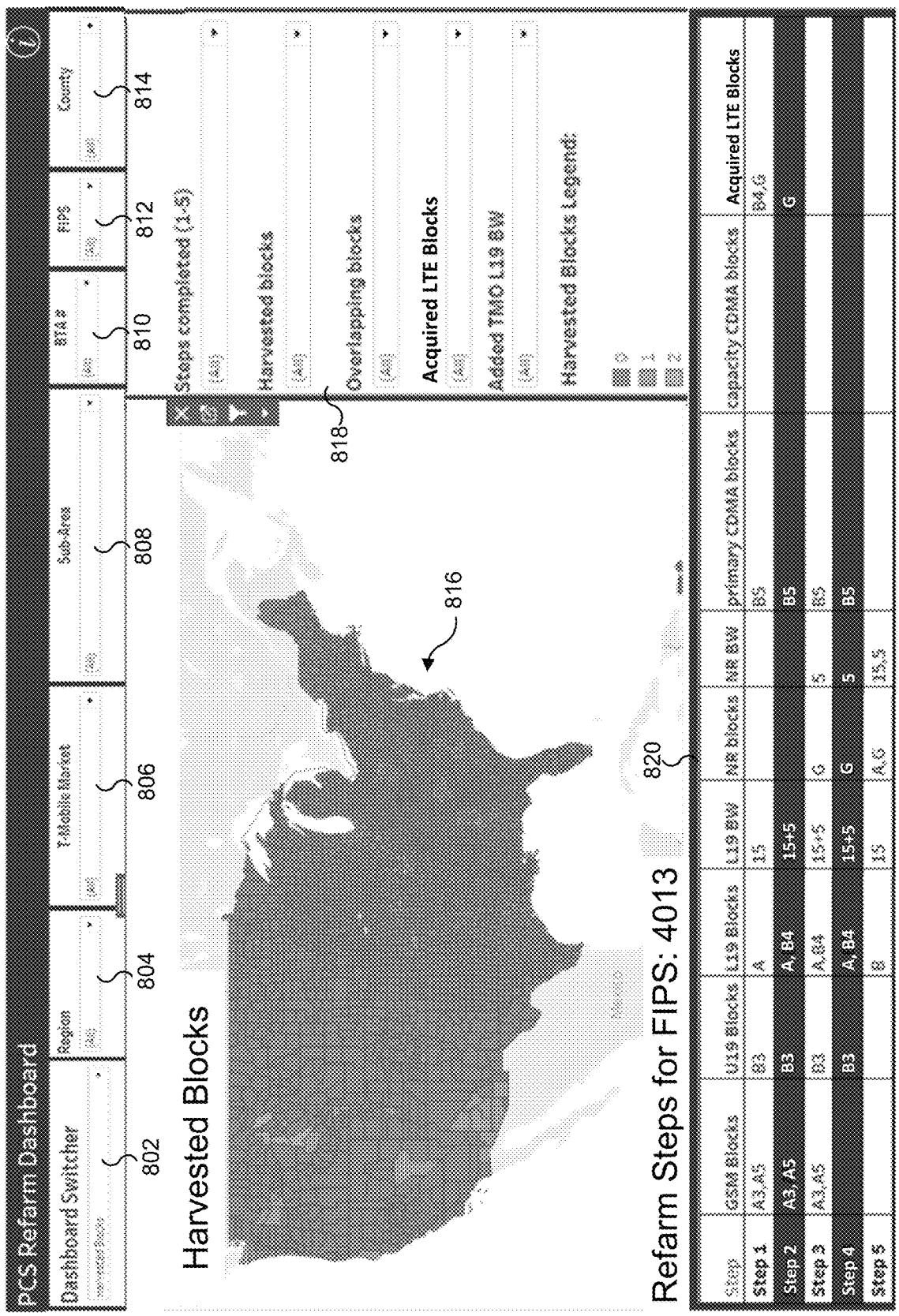
FIGS. 8-9 illustrate example visualizations generated to illustrate the results of a refarm process or the expected effects of a planned refarm process in some implementations.
Figure 9:
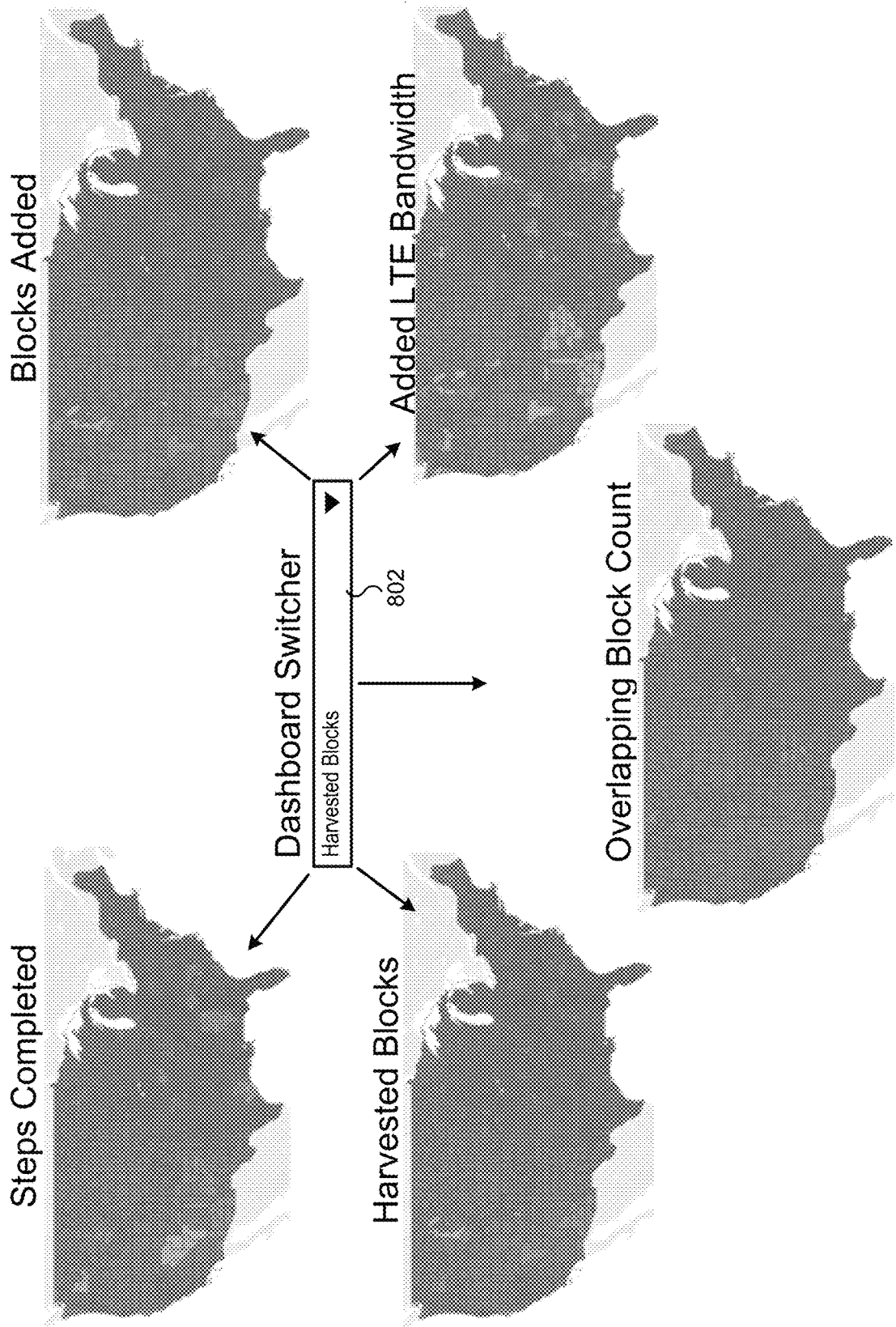
Figure 10A:
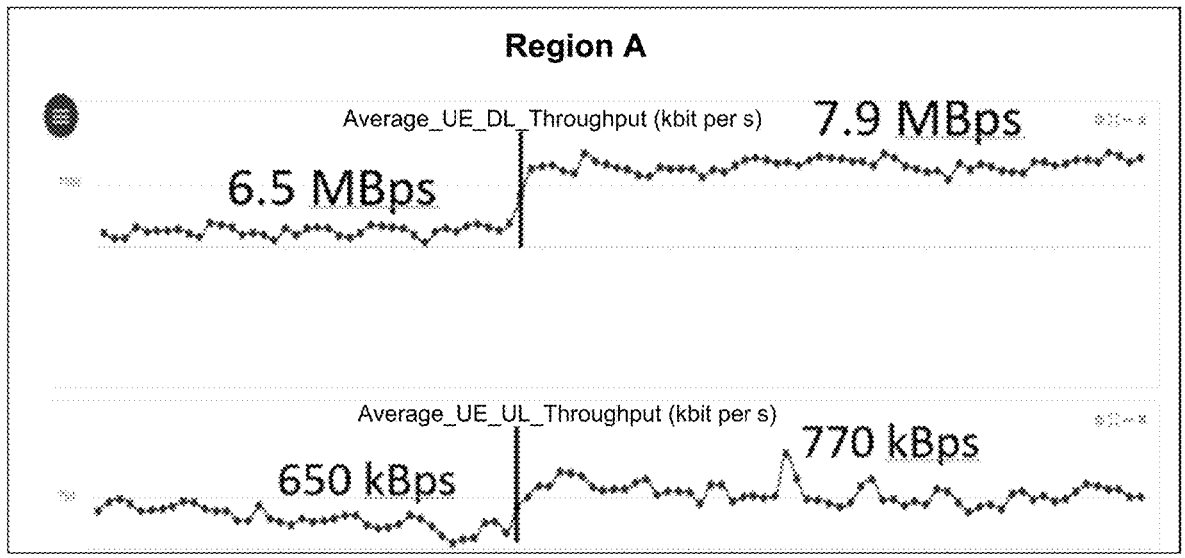
FIGS. 10A-10D illustrate improvements to download and upload throughput caused by refarming spectrum blocks in example geographic regions in some implementations.
Figure 10B:
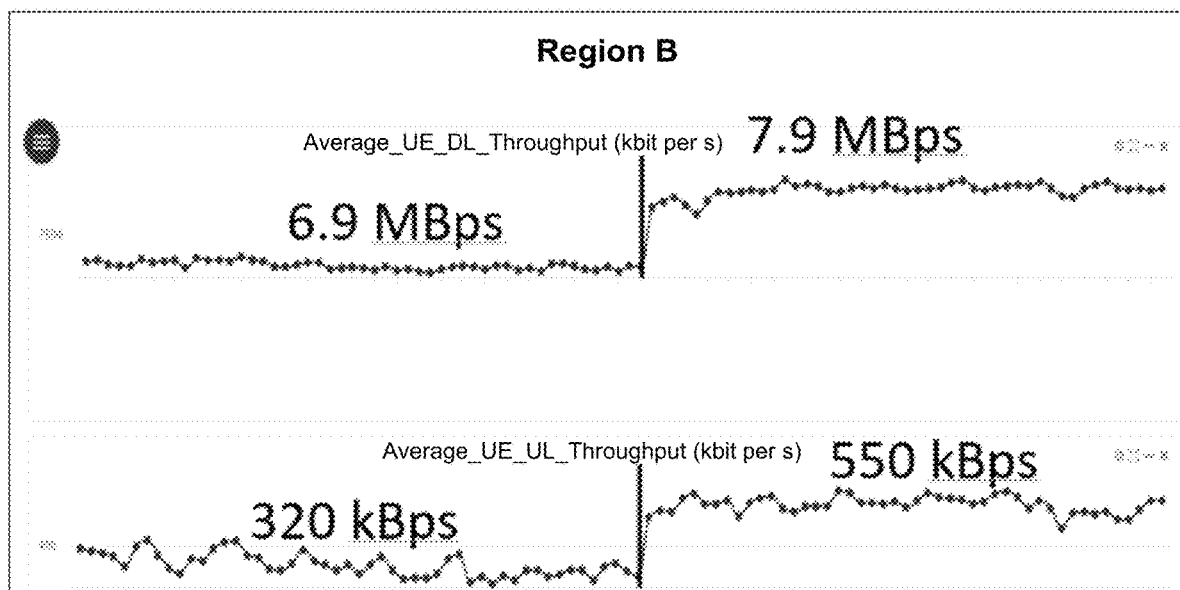
Figure 10C:
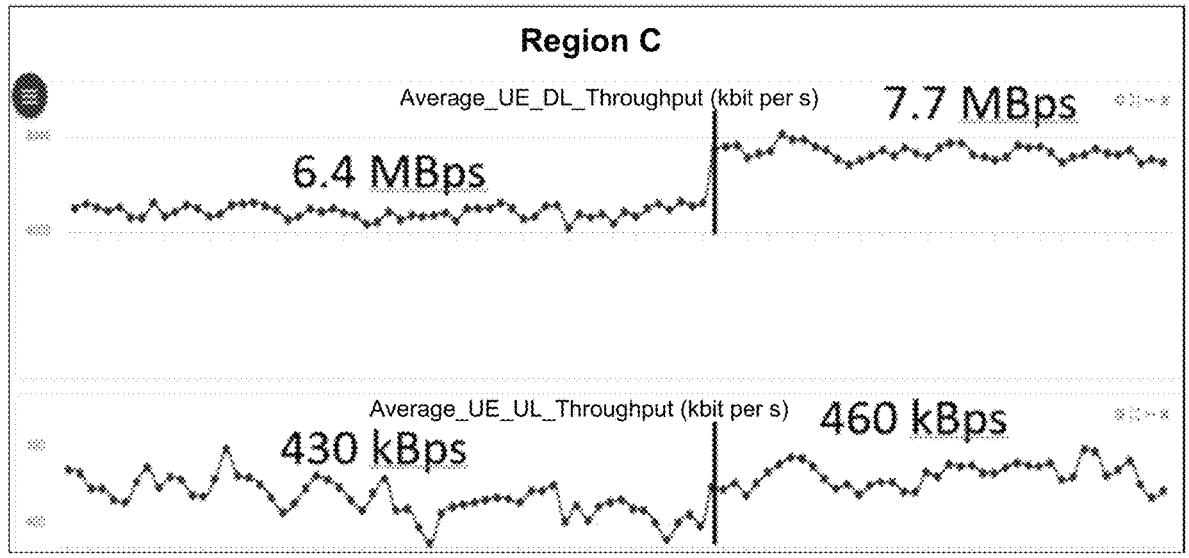
Figure 10D:
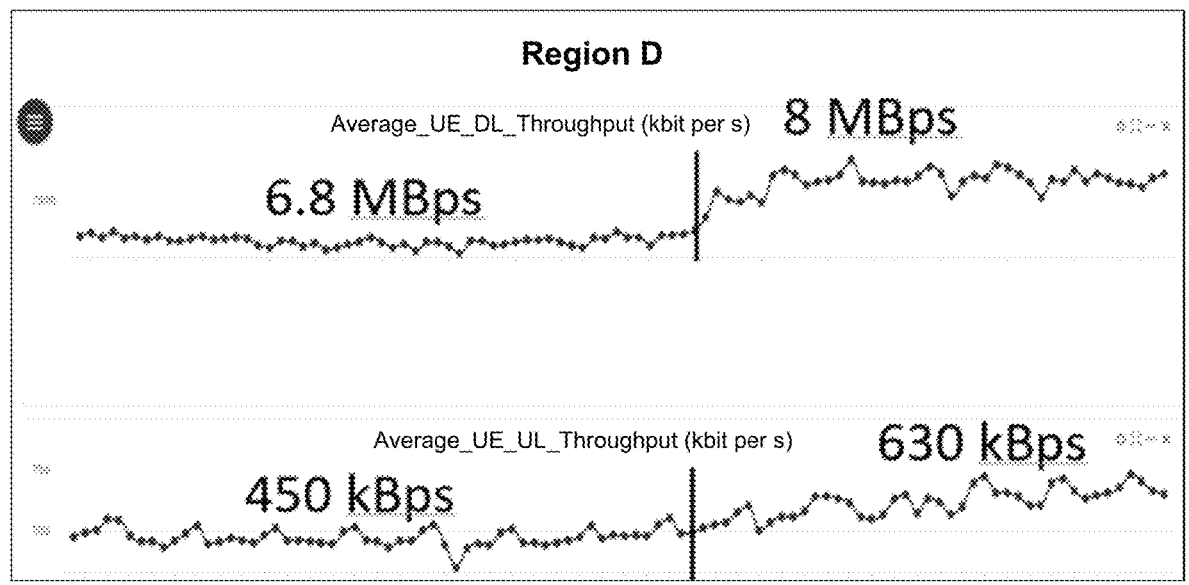

FIGS. 8-9 include example visualizations generated by the spectrum refarm system 210 to illustrate the results of a refarm process or the expected effects of a planned refarm process. In FIG. 8, an example refarm dashboard is illustrated. The refarm dashboard includes a menu 802 to enable a user to switch between types of visualizations that are in turn displayed within a map area 816. Example visualizations that are available to the user include visualizations that represent the numbers of spectrum blocks that have been refarmed ("harvested blocks"), visualizations that represent the number of refarm steps that have been performed ("steps completed"), visualizations that represent the number of spectrum blocks that are shared by two or more technologies ("overlapping blocks count"), visualizations that represent the amount of increase in bandwidth for a given technology ("added LTE bandwidth"), or visualizations that represent the number of blocks added to the telecom network, such as through acquisitions ("blocks added"). FIG. 9 illustrates examples of the various types of visualizations that can be selected for display within the dashboard shown in FIG. 8. Any of a variety of other types of visualizations can be generated in addition to or instead of those shown in FIG. 9, such as bar or pie charts counting a number of areas in which spectrum blocks have been refarmed, charts counting a number of refarmed blocks, or charts tracking a bandwidth increase for a particular technology as a result of refarming. The visualizations generated by the spectrum refarm system can create multiple benefits, including identifying strategic geographic regions where the network operator should focus its refarm efforts, comparing refarm strategies in adjacent geographic regions, or comparing refarm progress in adjacent geographic regions for the purpose of avoiding interference.

The spectrum refarm system 210 accesses the data stores 230 to generate each of the visualizations shown in FIGS. 8 and 9. As a user modifies the multistep refarm process associated with any of the geographic regions, the spectrum refarm system 210 updates the data represented by the dashboard visualizations shown in FIG. 8. For example, if the refarm process in a specified county causes the number of harvested blocks to increase, the spectrum refarm system 210 changes the color of the county on the map 816.

As further illustrated in FIG. 8, the dashboard includes menus for the user to filter the data shown in the visualization according to geographic criteria, such as filtering by region 804, market 806, sub-area 808, basic trading area (BTA) 810, county identification code such as a Federal Information Processing Standard (FIPS) code 812, or county name 814. Furthermore, a set of filters 818 are provided to select data according to its stage in the refarm process, to for example select spectrum sets that have a certain number of completed refarm steps, a certain number of harvested blocks, a certain number of overlapping blocks, a certain number of blocks of a given technology (e.g., LTE) that have been acquired, or a certain amount of added bandwidth for a given technology.

The dashboard can further include a section 820 to output the underlying data associated with a selected spectrum set. For example, FIG. 8 shows data associated with the county represented by FIPS 4013, illustrating the technologies in use within the county and the spectrum blocks on which the technologies are deployed, as well as the five steps of a multistep refarm process for the county.

FIGS. 10A-10D illustrate improvements to download and upload throughput caused by refarming spectrum blocks in four example geographic regions. As shown in these figures, each region experienced increased throughput after the spectrum block refarming performed according to implementations herein. In each of FIGS. 10A-10D, the top graph plots downlink throughput over a three-month interval while the bottom graph plots uplink throughput over the interval. The vertical bar marks the date when the first block was refarmed in the corresponding geographic region. To the left of the vertical bar, the graph shows an approximate average throughput value for a given technology and network operator. The data plotted to the right of the vertical bar shows an approximate average throughput value for the technology after the refarm. As shown in each of the graphs, the refarming process increases the throughput available to the technology in the corresponding geographic regions.

Computer System

Figure 11:
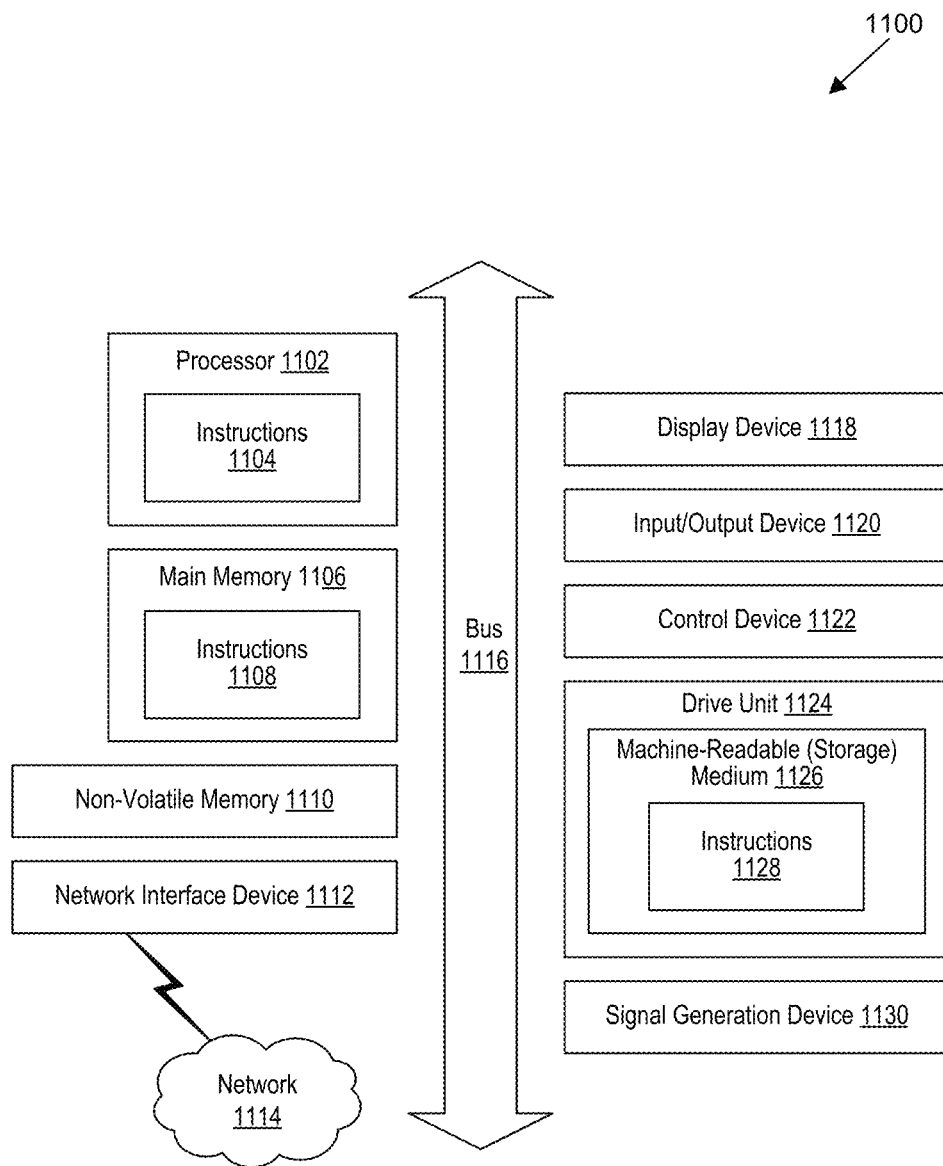
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, video display device 1118, an input/output device 1120, a control device 1122 (e.g., keyboard and pointing device), a drive unit 1124 that includes a storage medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementation, the computer system 1100 can be an embedded computer system, a system-on-chip (SOC), a single-board computer system (SBC) or a distributed system such as a mesh of computer systems or include one or more cloud components in one or more networks. Where appropriate, one or more computer systems 1100 can perform operations in real-time, near real-time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable (storage) medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, including any that may be listed in accompanying filing papers as well as and the applicant's concurrently filed U.S. application Ser. No. 17/560,106, entitled "Visual Reframing of Telecommunications Spectrum Blocks", are incorporated herein by reference in their entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. At least one computer-readable storage medium, excluding transitory signals and carrying instructions, which, when executed by at least one data processor of a system, cause the system to:
   define for each of a plurality of geographic regions, a spectrum set that represents multiple telecommunications spectrum blocks in use in a corresponding geographic region and a first distribution of technical allocations of each spectrum set,
      wherein the first distribution of technical allocations for an identified spectrum set specifies: (1) telecommunications technologies that are deployed on telecommunications spectrum blocks in the identified spectrum set, and (2) a number of the telecommunications spectrum blocks on which each telecommunication technology is deployed;
   maintain the defined spectrum sets in a data store;
   modify information in the data store to cause a distribution of technical allocations for a first spectrum set to change from a respective first distribution of technical allocations to a second distribution of technical allocations; and
   modify information in the data store to cause a distribution of technical allocations for a second spectrum set to change from a respective first distribution of technical allocations to a third distribution of technical allocations that is different from the second distribution of technical allocations.

2. The at least one computer-readable storage medium of claim 1, wherein defining the spectrum set for a specified geographic region of the plurality of geographic regions comprises:
   generating a mapping between telecommunications spectrum blocks and telecommunications operators in the specified geographic region;
   generating a mapping between telecommunications technologies and the telecommunications spectrum blocks in the specified geographic region;
   generating a mapping between network devices deployed in the specified geographic region and technical capabilities of the network devices; and
   storing the generated mappings in the data store.

3. The at least one computer-readable storage medium of claim 2, wherein defining the spectrum set for a specified geographic region of the plurality of geographic regions comprises:
   defining the spectrum set for the specified geographic region based on at least a subset of the generated mappings stored in the data store; and
   writing to the data store, a mapping between the specified geographic region and the spectrum set defined for the specified geographic region.

4. The at least one computer-readable storage medium of claim 1, wherein the first distribution of technical allocations for the first spectrum set includes a first telecommunications technology deployed on a first telecommunications spectrum block in the first spectrum set, and wherein causing the distribution of technical allocations for the first spectrum set to change from the respective first distribution of technical allocations to the second distribution of technical allocations comprises:
   terminating an allocation of the first telecommunications spectrum block to the first telecommunications technology; and
   after terminating the allocation of the first telecommunications spectrum block to the first telecommunications technology, causing deployment of a second telecommunications technology on the first telecommunications spectrum block.

5. The at least one computer-readable storage medium of claim 4, wherein the first distribution of technical allocations for the first spectrum set further includes the telecommunications technology deployed on a second telecommunications spectrum block in the first spectrum set, and wherein causing the distribution of technical allocations for the first spectrum set to change from the respective first distribution of technical allocations to the second distribution of technical allocations comprises:
   defining a multi-step process to change the distribution of technical allocations for the first spectrum set, wherein the multi-step process includes:
      a first act in which the second telecommunications technology is deployed on the first telecommunications spectrum block after the allocation of the first telecommunications spectrum block to the first telecommunications technology is terminated; and
      a second act in which a third telecommunications technology is deployed on a second telecommunications spectrum block after an allocation of the second telecommunications spectrum block to the first telecommunications technology is terminated.

6. The at least one computer-readable storage medium of claim 5, wherein the first act is carried out before the second act, after the second act, or coinciding in time with the second act.

7. The at least one computer-readable storage medium of claim 5, wherein at least one of the first act or the second act is initiated in response to a user input received at a user interface generated to visualize the multi-step process.

8. The at least one computer-readable storage medium of claim 5, wherein modifying the data store to cause the distribution of technical allocations for the first spectrum set to change from the respective first distribution of technical allocations to the second distribution of technical allocations comprises adding the first act to the data store by writing, to the data store, information indicating the first telecommunications spectrum block is to be changed from the first technology to the second technology.

9. The at least one computer-readable storage medium of claim 5, wherein modifying the data store to cause the distribution of technical allocations for the first spectrum set to change from the respective first distribution of technical allocations to the second distribution of technical allocations comprises:
identifying the first act in the data store; and
modifying the first act identified in the data store.

10. The at least one computer-readable storage medium of claim 1, wherein causing the distribution of technical allocations for the first spectrum set to change from the respective first distribution to the second distribution comprises:
adding a new telecommunications spectrum block to the first spectrum set; and
deploying a specified telecommunications technology on the new telecommunications spectrum block.

11. The at least one computer-readable storage medium of claim 1, wherein causing the distribution of technical allocations for the first spectrum set to change from the respective first distribution to the second distribution comprises:
removing a first telecommunications spectrum block from the first spectrum set to form a modified first spectrum set;
wherein the second distribution specifies: (1) telecommunications technologies that are deployed on remaining telecommunications spectrum blocks in the modified first spectrum set, and (2) a number of the remaining telecommunications spectrum blocks on which each telecommunication technology is deployed.

12. The at least one computer-readable storage medium of claim 1, wherein defining the spectrum set for each of the plurality of geographic regions comprises mapping an identity of each of the telecommunications spectrum blocks in the identified spectrum set to one or more telecommunications technologies that are deployed on the telecommunications spectrum block.

13. A system comprising:
at least one hardware processor; and
at least one non-transitory memory storing instructions, which, when executed by the at least one hardware processor, cause the system to:
maintain in a data store, definitions for each of a plurality of geographic regions, the definitions including a spectrum set that represents multiple telecommunications spectrum blocks in use in a corresponding geographic region and a first distribution of technical allocations of each spectrum set,
wherein the first distribution of technical allocations for an identified spectrum set specifies: (1) telecommunications technologies that are deployed on the multiple telecommunications spectrum blocks in the identified spectrum set, and (2) a number of the telecommunications spectrum blocks on which each telecommunication technology is deployed;
modify information in the data store to cause a distribution of technical allocations for a first spectrum set to change from a respective first distribution of technical allocations to a second distribution of technical allocations; and
modify information in the data store to cause a distribution of technical allocations for a second spectrum set to change from a respective first distribution of technical allocations to a third distribution of technical allocations that is different from the second distribution of technical allocations.

14. The system of claim 13, wherein the first distribution of technical allocations for the first spectrum set specifies telecommunications technologies that are deployed on the multiple telecommunications spectrum blocks in the first spectrum set and a number of the telecommunications spectrum blocks on which each telecommunication technology is deployed, wherein the first distribution of technical allocations for the first spectrum set includes a first telecommunications technology deployed on a first telecommunications spectrum block in the first spectrum set, and wherein causing the distribution of technical allocations for the first spectrum set to change from the respective first distribution of technical allocations to the second distribution of technical allocations comprises:
terminating an allocation of the first telecommunications spectrum block to the first telecommunications technology; and
after terminating the allocation of the first telecommunications spectrum block to the first telecommunications technology, causing deployment of a second telecommunications technology on the first telecommunications spectrum block.

15. The system of claim 13, wherein causing the distribution of technical allocations for the first spectrum set to change from the respective first distribution of technical allocations to the second distribution of technical allocations comprises:
adding a new telecommunications spectrum block to the first spectrum set; and
deploying a specified telecommunications technology on the new telecommunications spectrum block.

16. The system of claim 13, wherein causing the distribution of technical allocations for the first spectrum set to change from the respective first distribution of technical allocations to the second distribution of technical allocations comprises:
removing a telecommunications spectrum block from the first spectrum set.

17. A computer-implemented method comprising:
defining for each of a plurality of geographic regions, a spectrum set that represents multiple telecommunications spectrum blocks in use in a corresponding geographic region and a first distribution of technical allocations of each spectrum set,
wherein the first distribution of technical allocations for an identified spectrum set specifies: (1) telecommunications technologies that are deployed on the multiple telecommunications spectrum blocks in the identified spectrum set, and (2) a number of the telecommunications spectrum blocks on which each telecommunication technology is deployed;

maintaining the defined spectrum sets in a data store;

modifying information in the data store to cause a distribution of technical allocations for a first spectrum set to change from a respective first distribution of technical allocations to a second distribution of technical allocations; and modifying information in the data store to cause a distribution of technical allocations for a second spectrum set to change from a respective first distribution of technical allocations to a third distribution of technical allocations that is different from the second distribution of technical allocations.

18. The method of claim 17, wherein defining the spectrum set for a specified geographic region of the plurality of geographic regions comprises:

generating a mapping between telecommunications spectrum blocks and telecommunications operators in the specified geographic region;

generating a mapping between telecommunications technologies and the telecommunications spectrum blocks in the specified geographic region;

generating a mapping between network devices deployed in the specified geographic region and technical capabilities of the network devices;

defining the spectrum set for the specified geographic region based on at least a subset of the generated mappings stored in the data store; and writing to the data store, a mapping between the specified geographic region and the spectrum set defined for the specified geographic region.

19. The method of claim 17, wherein the first distribution of technical allocations for the first spectrum set includes a first telecommunications technology deployed on a first telecommunications spectrum block in the first spectrum set, and wherein causing the distribution of technical allocations for the first spectrum set to change from the respective first distribution of technical allocations to the second distribution of technical allocations comprises:

terminating an allocation of the first telecommunications spectrum block to the first telecommunications technology; and after terminating the allocation of the first telecommunications spectrum block to the first telecommunications technology, causing deployment of a second telecommunications technology on the first telecommunications spectrum block.

20. The method of claim 17, wherein causing the distribution of technical allocations for the first spectrum set to change from the respective first distribution of technical allocations to the second distribution of technical allocations comprises:

adding a new telecommunications spectrum block to the first spectrum set; and deploying a specified telecommunications technology on the new telecommunications spectrum block.

* * * * *